March 28, 1944.　　C. B. WILLIAMS, JR　　2,345,166
CUTTING MACHINE
Filed Oct. 26, 1942　　5 Sheets-Sheet 4

Inventor
CARL B. WILLIAMS JR.

Frank Fraser
Attorney

March 28, 1944.    C. B. WILLIAMS, JR    2,345,166
CUTTING MACHINE
Filed Oct. 26, 1942    5 Sheets-Sheet 5

Inventor
CARL B. WILLIAMS JR.
Frank Fraser
Attorney

Patented Mar. 28, 1944

2,345,166

UNITED STATES PATENT OFFICE 2,345,166

CUTTING MACHINE

Carl B. Williams, Jr., Toledo, Ohio, assignor to Libbey-Owens-Ford Glass Company, Toledo, Ohio, a corporation of Ohio Application October 26, 1942, Serial No. 463,326

17 Claims. (Cl. 33—27)

The present invention relates to cutting machines in general and more particularly to a machine for cutting curved glass lenses or other curved glass articles.

Although the invention is not restricted to any particular use, it is of especial utility in the cutting of concavo-convex lenses such as are ordinarily used in goggles, gas masks, and the like. Likewise, while the invention is primarily adapted for the cutting of lenses or other articles from sheets of laminated safety glass including two plates of glass and an interposed layer of thermoplastic material bonded together to provide a composite structure, it may also be utilized for the cutting of single sheets or plates of glass.

It has been heretofore customary when cutting curved or bent sheets of laminated safety glass to first score one of the glass plates and crack the same along the score line, after which the second glass plate is scored along a line directly opposite the first score line and said second plate then cracked along its score line. The glass is then separated along the lines of cut by stretching the plastic interlayer and the plastic finally severed by means of a razor blade or the like.

An object of this invention is the provision of a cutting machine of improved construction, combination and arrangement for cutting out from curved or bent sheets of laminated safety glass, lenses or other articles of predetermined contour more rapidly, accurately and economically than heretofore possible.

Another object of the invention is the provision of a cutting machine of the above character embodying means by which the curved or bent sheet of laminated safety glass can be simultaneously cut along two parallel oppositely disposed lines on opposite sides respectively of the composite sheet whereby both glass plates can be cut in a single operation.

Another object of the invention is the provision of a cutting machine of the above character including upper and lower cutting units for scoring the outer surfaces of the two plates of glass and embodying means for connecting the cutting units together so that they operate in unison to insure that the score lines on the two plates of glass will be directly opposite and in alignment with one another.

A further object of the invention is the provision of a cutting machine of the above character embodying means for normally maintaining the sheet of safety glass out of engagement with the cutting tools of the cutting units during the positioning of the sheet upon the machine and its removal therefrom together with means for clamping the sheet in place and simultaneously causing the cutting tools to be brought into engagement therewith at the beginning of the cutting operation.

A still further object of the invention is the provision of a cutting machine of the above character embodying means for maintaining the cutting tools in proper cutting position between successive cutting operations so that when the cutting tools are brought into engagement with the sheet at the beginning of each cutting operation they will be tangent to the line of cut and ready for cutting.

Still another object of the invention is to provide a cutting machine of the above character including a template curved to correspond to the curvature of the lens or other article to be cut and which serves to guide both the upper and lower cutting units through their predetermined paths of cut.

Still another object of the invention is to provide a cutting machine of the above character including means for counterbalancing the cutting units and connecting means therefor to facilitate the propelling of the cutting units around the template and for increasing the action of the counterbalancing means when the said cutting units reach a point in their travel where such increased action is desirable.

Other objects and advantages of the invention will become more apparent during the course of the following description, when taken in connection with the accompanying drawings.

In the drawings, wherein like numerals are employed to designate like parts throughout the same.

Figure 2:
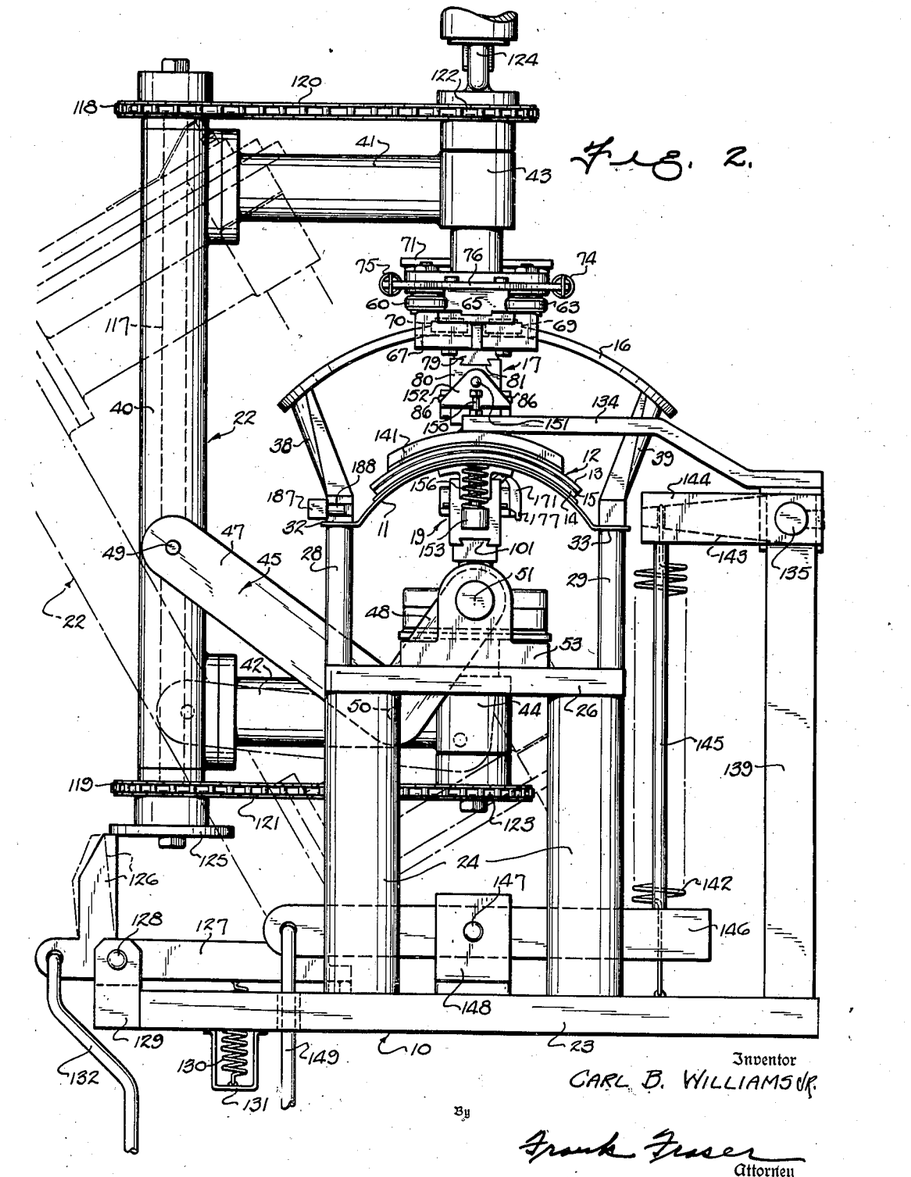
Fig. 2 is an end view thereof.
Figure 3:
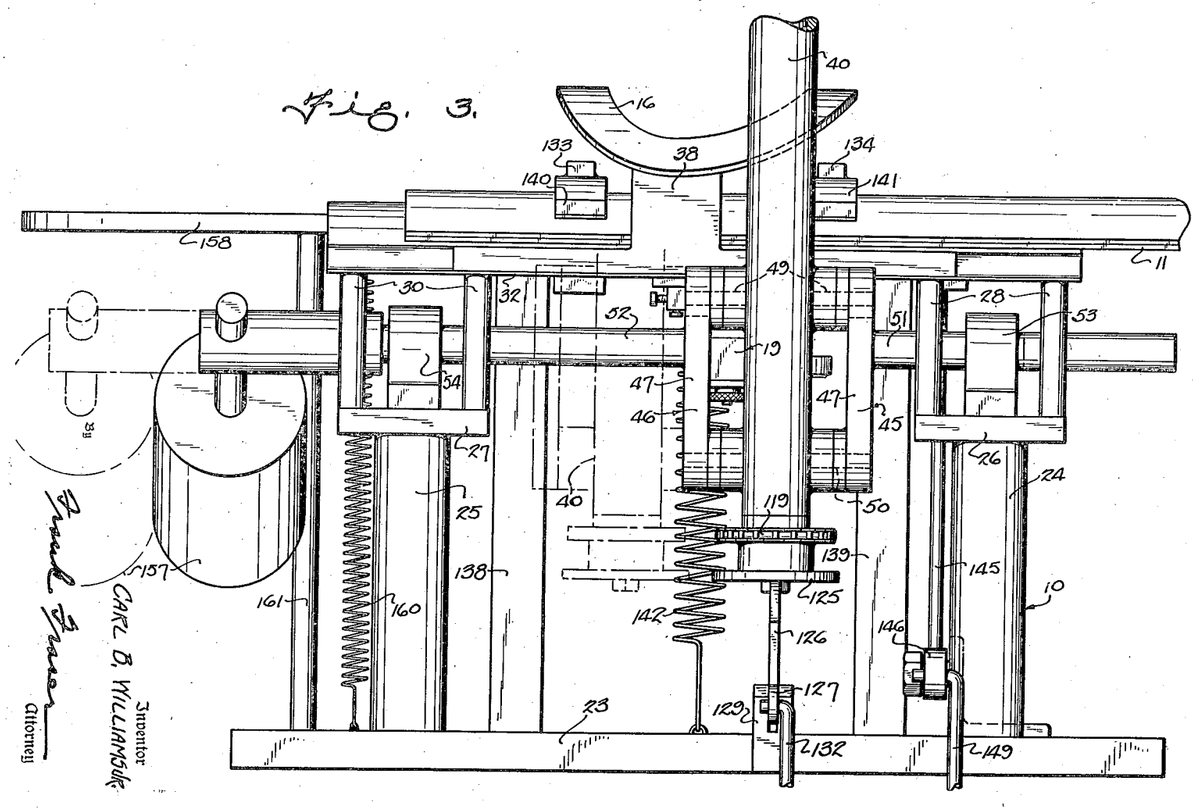
Fig. 3 is a front view of the machine with the upper cutting unit removed.

In general, the cutting machine of this invention comprises a stationary supporting structure 10 having associated therewith a horizontal, substantially rectangular table 11 curved transversely to correspond to the curvature of the sheet of laminated safety glass 12 to be cut and upon which the said sheet is supported during the cutting operation. As shown in Fig. 2, the sheet of laminated safety glass 12 is concavo-convex in cross section and comprises the two plates of glass 13 and 14 and interposed layer of thermoplastic 15 adherent thereto to provide a composite structure.

Arranged above the cutting table 11 in vertically spaced relation thereto is a track template 16 also curved transversely to conform to the curvature of the table 11 and having the same configuration as the lens or other article to be cut from the sheet of safety glass. Mounted upon the track template 16 and guided thereby is the upper cutting unit 17 provided with a rotatable steel cutting wheel 18 adapted to engage the upper glass sheet 13, while mounted beneath the table is the lower cutting unit 19 provided with a rotatable steel cutting wheel 20 which operates through an opening 21 in said table (Fig. 4) and is adapted to engage the bottom sheet of glass 14.

The upper and lower cutting units 17 and 19 are connected together by a substantially C-shaped frame 22 in such a manner that upon propelling of the upper cutting unit 17 around the template 16 the lower cutting unit 19 will move in unison therewith to effect the scoring of the glass sheets 13 and 14 along lines of cut which are directly opposite and in alignment with one another.

Figure 1:
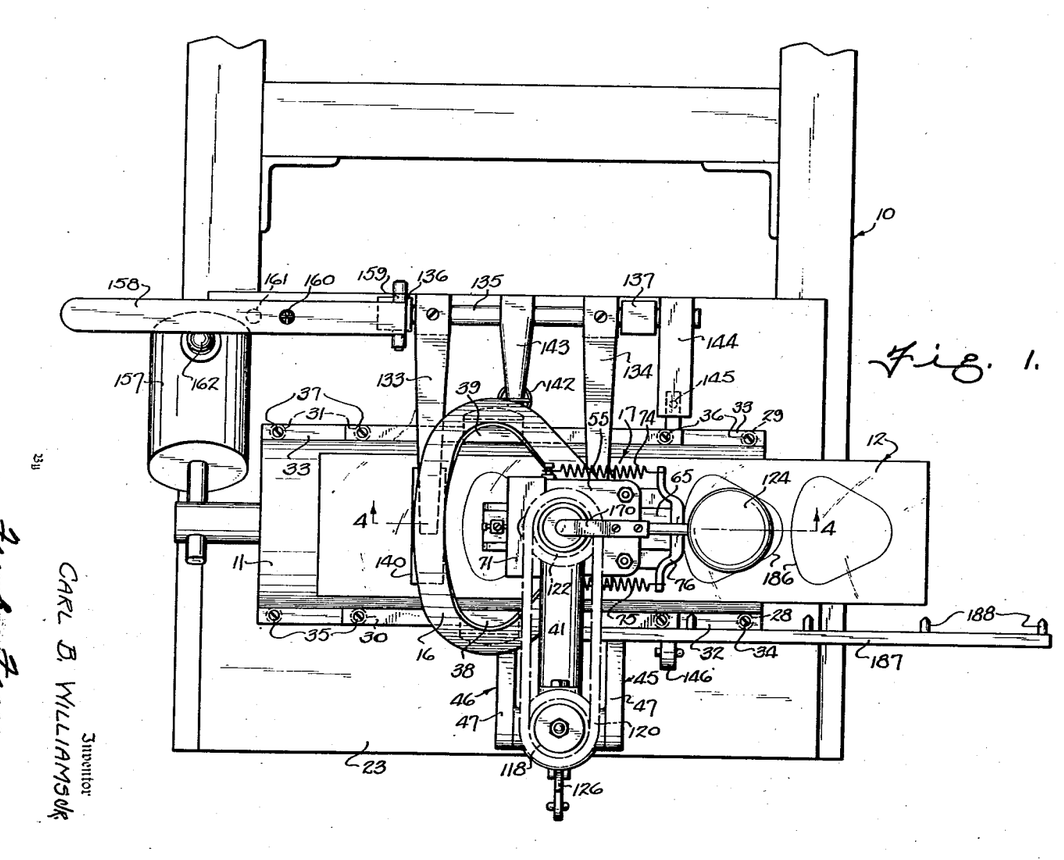
Fig. 1 is a plan view of a cutting machine constructed in accordance with the invention.

More particularly, the supporting structure 10 comprises a horizontal rectangular base 23 provided adjacent one end thereof with a pair of transversely spaced vertical pillars 24 and adjacent its opposite end with a pair of similar vertical pillars 25. Extending between and secured upon the tops of pillars 24 is a horizontal plate 26, while a similar plate 27 is secured upon the tops of pillars 25. Secured to the plate 26 at the forward end thereof are the spaced vertical posts 28 and at the rear end thereof posts 29. Similar pairs of posts 30 and 31 are secured to the plate 27. Carried upon the upper ends of the posts 28, 29, 30 and 31 is the cutting table 11, said table being concavo-convex in transverse cross section having its convex surface disposed upwardly and provided along its opposite longitudinal edges with outwardly directed horizontal flanges 32 and 33 secured respectively upon the tops of posts 28—30 by screws 34—35 and upon the tops of posts 29—31 by screws 36—37 (Fig. 1).

Carried by the table 11 intermediate the ends thereof are the upwardly diverging standards 38 and 39 to the upper ends of which is secured the template 16 upon which the upper cutting unit 17 is mounted. As the upper cutting unit 17 is propelled around the template 16 it will be caused to move both transversely and longitudinally of the table 11 to effect the scoring of the upper surface of the laminated sheet 12 by the cutting wheel 18. To insure that the lower cutting unit 19 will move in unison with the upper cutting unit and thereby effect simultaneous scoring of the bottom surface of the laminated sheet by the cutting wheel 20, the upper and lower cutting units are connected together by a substantially C-shaped frame 22. The frame 22 connecting the cutting units 17 and 19 for simultaneous movement comprises a vertical tube 40 and the rearwardly directed, substantially horizontal, upper and lower arms 41 and 42 arranged above and beneath the table 11 and provided at their free ends with vertical bearings 43 and 44 respectively in which the cutting units 17 and 19 are mounted for rotatable movement about vertical axes as will be more fully hereinafter described. The frame 22 is mounted for pivotal movement transversely of the table upon the two substantially V-shaped levers 45 and 46. As shown in Fig. 2, each lever comprises a relatively long portion 47 and a relatively shorter portion 48. The levers are secured at their outer ends as at 49 to the tube 40 and at substantially the juncture of the portions 47 and 48 to the horizontal arm 42 as at 50. Secured to the shorter portions 48 of levers 45 and 46 at their outer ends are oppositely directed horizontal shafts 51 and 52 respectively extending longitudinally of the table 11 and slidably journaled in aligned bearings 53 and 54 supported upon the plates 26 and 27. The frame 22 is therefore adapted to rock transversely of the table about the axis of the shafts 51 and 52, as indicated in broken lines in Fig. 2, and is also adapted for bodily movement longitudinally of the table upon sliding of the shafts 51 and 52 in bearings 53 and 54.

The upper cutting unit 17 comprises a substantially rectangular horizontal top plate 55 carried at the lower end of a vertical shaft 56 rotatably mounted in the bearing 43 at the free end of arm 41 of frame 22. The shaft 56 is provided beneath the bearing 43 with an enlarged portion 57 terminating in a reduced threaded portion 58 threaded within an opening in the top plate 55 of the cutting unit.

Figure 5:
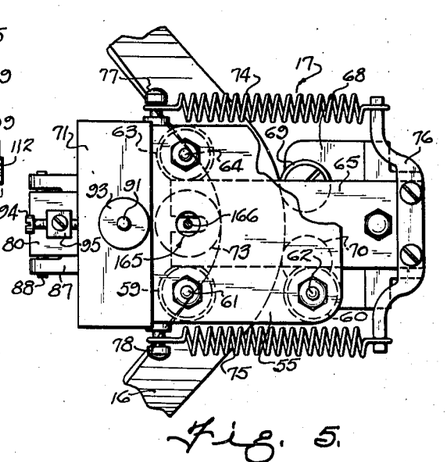
Fig. 5 is a plan view of the upper cutting unit.
Figure 6:
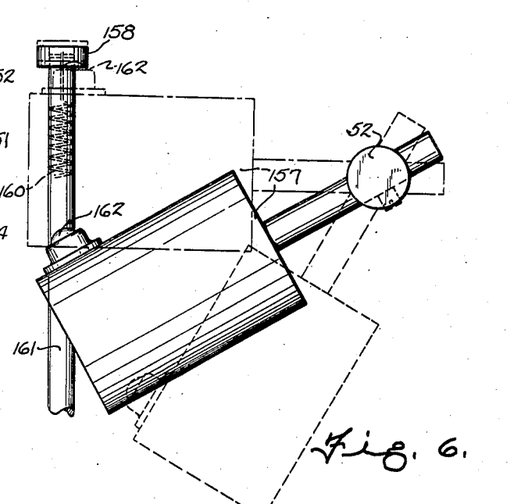
Fig. 6 is a detail view of the means for counterbalancing the cutting units.

Carried upon the under side of the top plate 55 adjacent one side thereof are the aligned rollers 59 and 60 mounted upon vertical spindles 61 and 62 respectively, while carried upon the under side of said top plate adjacent the opposite side thereof are similar aligned rollers 63 mounted upon vertical spindles 64 and positioned opposite the rollers 59 and 60 (Fig. 5). Slidably received between the rollers 59—60 and 63 is a horizontal slide bar 65 positioned above the track template 16 and extending at right angles thereto; said slide bar being provided in its opposite side edges with grooves 66 to receive the rollers 59—60 and 63 therein.

Secured upon the under side of the slide bar 65 at the outer end thereof is a roller support 67 having a substantially horizontal portion 68 carrying a pair of spaced apart, freely rotatable rollers 69 and 70 which engage the adjacent side face of the template 16. The horizontal top plate 55 of the cutting unit is provided at its inner end with a vertical cutter head 71 including a substantially horizontal base portion 72 carrying a freely rotatable roller 73 engaging the adjacent side face of the template. The roller 73 carried by the cutter head engages the template at a point intermediate the rollers 69 and 70.

The rollers 69 and 70 carried by slide bar 65 are maintained in yieldable engagement with the template by tension springs 74 and 75, said springs being fastened at one end to a cross strap 76 carried at the outer end of slide bar 65 and at their opposite ends to pins 77 and 78 carried by the cutter head 71.

Figures 4, 9:
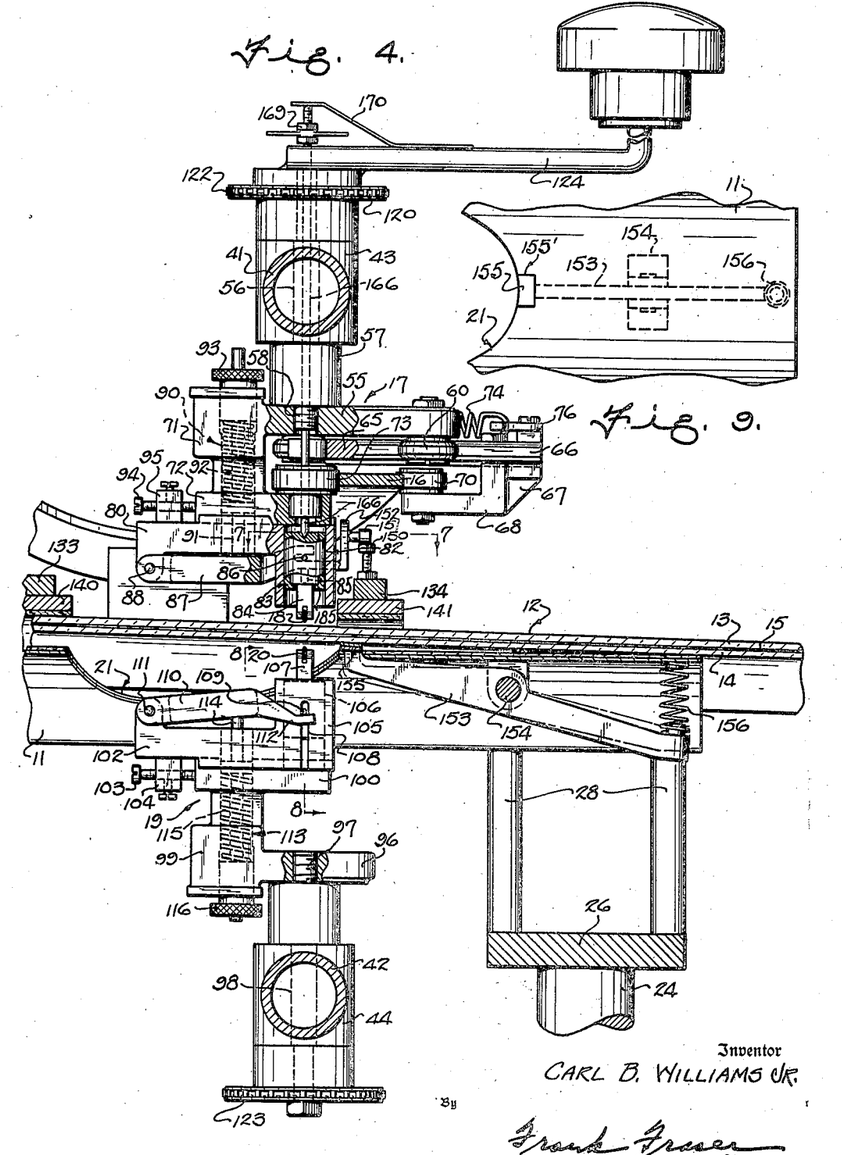
Fig. 4 is a vertical longitudinal section through the machine taken substantially on line 4—4 of Fig. 1.
Fig. 9 is a detail plan view of a portion of the cutting table.
Figure 7:
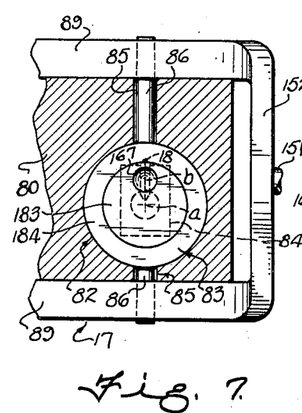
Fig. 7 is a detail horizontal section of the upper cutting unit taken substantially on line 7—7 of Fig. 4.

The horizontal base portion 72 of cutter head 71 is formed with a dove-tailed rib 79 (Fig. 2) carrying a horizontal plate 80 provided in its upper surface with an undercut groove 81 receiving the rib 79 therein. The plate 80 is provided at its inner end with a cylindrical well 82 in which is received a cylindrical cutter holder 83. As shown in Figs. 4 and 7, the cutter holder 83 comprises a core 183 freely rotatable in a jacket 184 provided at its lower end with an internal shoulder 185 serving to support the core 183 and maintain it in place. The core 183 of cutter holder 83 is provided with a depending leg portion 84 projecting below the well 82 and carrying the rotatable steel cutting wheel 18. The side wall of the well 82 is provided with aligned vertical slots 85 and carried by the jacket 184 of cutter holder 83 are horizontal pins 86 which project outwardly through said slots.

Carried by the plate 80 is a substantially horizontal lever 87 pivoted at its outer end to said plate as at 88 and being bifurcated at its inner end to provide spaced legs 89 which straddle the well 82 and engage the horizontal pins 86. The cutter head 71 is provided with a vertical opening 90 in which is located a vertical pressure pin 91 normally urged downwardly into engagement with the lever 87 by a spring 92 maintained within said opening 90 by a nut 93 threaded within the upper end of the said opening and receiving the upper end of the pressure pin 91 loosely therethrough. With this construction, the cutting wheel 18 will be yieldably maintained in engagement with the sheet to be cut during the cutting operation. The plate 80 may be adjusted horizontally relative to the cutter head 71 by means of a set screw 94 which passes through a boss 95 on the said plate 80 and engages the cutter head.

The lower cutting unit 19 comprises a vertical cutter head 99 having formed integral therewith a horizontal ear 96 secured to the threaded upper end 97 of a vertical shaft 98 rotatable within the bearing 44 at the outer end of arm 42 of connecting frame 22. The cutter head is provided at its upper end with a horizontal base portion 100 having formed upon its upper surface a dove-tailed rib 101 (Fig. 2) upon which is mounted a plate 102 horizontally adjustable by a screw 103 passing through a boss 104 carried by said plate and engaging base portion 100. Formed integral with the plate 102 is a cylindrical well 105 in which is mounted a cylindrical cutter holder 106 provided with an upwardly projecting rectangular extension 107 carrying the cutting wheel 20. The side wall of the well 105 is provided with aligned vertical slots 108 and carried by the cutter holder 106 are horizontal pins 109 which project outwardly through said slots. Carried by the plate 102 is a substantially horizontal lever 110 pivoted at its outer end to said plate as at 111 and being bifurcated at its inner end to provide spaced legs 112 which straddle the well 105 and engage the horizontal pins 109. The cutter head 99 is provided with a vertical opening 113 in which is located a vertical pressure pin 114, normally urged upwardly into engagement with the lever 110 by a spring 115 maintained within said opening 113 by a nut 116. With this construction the cutting wheel 20 is normally urged upwardly into cutting position.

As pointed out above, the upper and lower cutting units 17 and 19 are adapted to be actuated in unison and to this end there is mounted within the vertical tube 40 of connecting frame 22 a shaft 117 to the upper and lower ends of which are keyed sprocket wheels 118 and 119 respectively about which are trained sprocket chains 120 and 121. The sprocket chain 120 is also trained about a sprocket wheel 122 fixed to the shaft 56 of upper cutting unit 17, while sprocket chain 121 is trained about a sprocket wheel 123 fixed to the shaft 98 of lower cutting unit 19. Also secured to the upper end of shaft 56 of upper cutting unit 17 is a handle 124 by which the operator can rotate said shaft and at the same time propel the cutting unit around the template. The movement of the upper cutting unit will be imparted to the lower cutting unit through the sprocket chains 120—121 and associated sprocket wheels 118—122 and 119—123 as above described.

At the start of the cutting operation and also upon completion thereof, the cutting units 17 and 19 are disposed directly above and beneath the cutting table 11 as illustrated in full lines in Fig. 2. For the purpose of bringing the cutting units to a stop at the completion of their cutting cycle and for also maintaining them in position between successive cutting operations, there is fixed to the lower end of shaft 117 a disk 125 and coacting with said disk is a vertical latch 126 formed integral with a horizontal bar 127 pivoted adjacent its outer end as at 128 to a bracket 129 on base 23. The upper end of latch 126 is normally held in engagement with the bottom of disk 125 as shown in full lines in Fig. 2 by a spring 130 attached at one end to the bar 127 and at its opposite end to a bracket 131 carried by base 23. When the latch 126 is in engagement with the disk 125 the cutting units are prevented from being moved around the template 16. In order to disengage the latch 126 from disk 125, there is connected to the outer end of bar 127 a depending rod 132 secured at its lower end to a foot-pedal (not shown). Thus, when it is desired to actuate the cutting units, the rod 132 is drawn downwardly to move the latch 126 out of engagement with disk 125 as shown in broken lines. When this has been done, the operator, by grasping handle 124, can move the upper cutting unit 17 around template 16 whereupon the lower cutting unit 19 will move in unison therewith. Upon release of rod 132, the latch 126 will be automatically returned to operative position by the spring 130 and will again be engaged by the disk 125 upon completion of the cutting operation.

During the cutting operation, the sheet 12 to be cut is adapted to be firmly clamped upon the table 11 and this is accomplished by the two substantially horizontal clamping arms 133 and 134 fixed at their outer ends to a longitudinally extending shaft 135 journaled in bearings 136 and 137 at the upper ends of posts 138 and 139. The clamping arms 133 and 134 are provided at their inner ends with clamp pads 140 and 141 respectively which are curved to correspond to the curvature of the sheet to be cut as shown in Fig. 2. The clamping pads 140 and 141 are normally urged downwardly into clamping engagement with the sheet by a tension spring 142 secured at its upper end to the outer end of a horizontal arm 143 fixed to shaft 135 and at its lower end to the base 23.

For the purpose of moving the clamping pads 140 and 141 upwardly out of sheet clamping position, there is fixed to the shaft 135 at one end thereof a horizontal block 144 and secured thereto is the upper end of a depending rod 145 secured at its lower end to a substantially horizontal lever 146 pivoted intermediate its ends as at 147 to a bracket 148 on base 23. Connected to the end of lever 146 remote from post 145 is one end of a depending rod 149 secured at its lower end to a suitable foot-pedal (not shown). Upon drawing of the rod 149 downwardly to rock the lever 146 in a counter-clockwise direction the post 145 will move the block 144 upwardly against the action of spring 142 to rotate shaft 135 in a clockwise direction (Fig. 2) to raise the clamping pads 140 and 141 from the sheet. Upon release of rod 149, the spring 142 will rock shaft 135 in the opposite direction to return the clamping pads to clamping position.

In the machine herein provided, the cutting wheel 18 of upper cutting unit 17 is normally urged downwardly into cutting position by the spring 92 while the cutting wheel 20 of lower cutting unit 19 is normally urged upwardly into cutting position by spring 115. Therefore, in order to permit proper positioning of the sheet to be cut upon the cutting table, means is herein provided for raising the cutting wheel of the upper cutting unit out of cutting position and for also maintaining the sheet out of engagement with the cutting wheel of the lower cutting unit during positioning of the sheet upon the table and its subsequent removal therefrom. To this end, there is secured to the top of the clamping arm 134 of clamping pad 141 a vertical set screw 150 adapted to engage a horizontal lug or the like 151 carried by a vertical strap 152 connecting the bifurcated legs 89 of lever 87 at their outer ends. Thus, when the upper cutting unit 17 is in the position shown in Fig. 2 and the clamping pads 140 and 141 are raised to permit positioning of the sheet 12 upon the table 11, the set screw 150 engaging lug 151 will move the outer end of lever 87 upwardly, whereupon the legs 89 thereof engaging pins 86 of cutter holder 83 will raise the cutting wheel 18 out of cutting position as shown in Fig. 2.

Since the cutting wheel 20 of lower cutting unit 19 is normally urged upwardly into cutting position, means is provided for maintaining the sheet in a slightly elevated position relative to the table as shown in Fig. 4 during the positioning thereof upon the table and its removal therefrom. As therein shown, there is carried upon the under side of cutting table 11 a lever 153 pivoted intermediate its ends as at 154. The forward end of lever 153 carries a horizontal pad 155 constituting an insert which is set in a recess 155' formed in said table as shown in Fig. 9. The pad 155 is normally maintained slightly above the upper surface of the table by a spring 156 disposed between the bottom of said table and the outer end of lever 153.

Assuming the cutting units 17 and 19 are in position for cutting as shown in Fig. 2 and the clamping pads 140 and 141 have been raised by actuation of rod 149 to move the cutting wheel 18 of upper cutting unit 17 upwardly, the sheet 12 is placed upon the table 11 at which time it will be maintained out of contact with the cutting wheel 20 of lower cutting unit 19 by the elevated pad 155. After the sheet has been properly positioned and it is desired to effect the cutting thereof, the operator releases rod 149, whereupon the strength of spring 142 will be sufficient to draw the clamping pads downwardly to engage the sheet and, at the same time, force the sheet downwardly upon the table against the action of spring 156. When the sheet is forced downwardly upon the table, it will engage the cutting wheel 20 of lower cutting unit 19 and upon lowering of the clamping pads 140 and 141 the cutting wheel 18 of upper cutting unit 17 will also be lowered into engagement with the sheet. The sheet is now firmly clamped upon the table with the cutting wheels 18 and 20 in contact therewith. The upper cutting unit can now be moved around the template 16 by the operator in the manner above described, whereupon the lower cutting unit will move in unison therewith to effect the simultaneous scoring of opposite surfaces of the sheet 12 along parallel lines directly opposite one another.

In order to facilitate the propelling of the cutting units around the template, means is preferably provided for counterbalancing the said cutting units and associated parts. For this purpose, there is secured to the outer end of horizontal shaft 52 a counterweight 157 which is positioned at the side of the shaft opposite the connecting frame 22 for the cutting units. The action of the counterweight 157 is ordinarily sufficient except when the cutting units are in their most forward position, at which time the connecting frame 22 and associated parts are swung forwardly into broken line position indicated in Fig. 2. Thus, in order to move the cutting units rearwardly, it is necessary to overcome the weight of the connecting frame 22 and associated parts. To facilitate the rearward movement of the cutting units increased counterbalancing action is desirable. To accomplish this, there is provided a horizontal strap 158 hinged at one end to the bearing 136 of shaft 135 as at 159. The strap is normally drawn downwardly by a spring 160 and is limited in its downward movement by a vertical post 161. Mounted in the upper side of the counterweight 157 is a freely rotatable ball 162 adapted to engage the strap 158 as the cutting units are drawn forwardly. When this occurs, the spring 160 will be extended to cause the strap 158 to press with increased pressure upon the counterweight 157, whereupon the action of the counterweight will be increased and thereby permit the operator to more easily move the cutting units rearwardly.

In accordance with this invention, the cutting wheels 18 and 20 of the upper and lower cutting units 17 and 19 are of the so-called caster or swivel type in which the cutting wheel is caused to trail the cutter holder upon movement of the cutting unit and be thereby constantly maintained in its most effective cutting position eliminating all binding or cramping. This trailing action of the cutting tool increases the ease of operation, materially decreases the wear of the cutting wheel in use, and provides for the cutting of regular and irregular curves with greater speed and accuracy. Thus, the cutting wheel will remain in tangential relation to the line of cut at all times. To this end, the cutter holders are mounted to turn freely so that the respective cutting wheel will automatically adjust itself to follow any given course or direction.

With reference first to the upper cutting unit 17 and as shown in Fig. 7, the core 183 of cutter holder 83 is freely rotatable about a vertical axis designated $a$, while the cutting wheel 18 rotates about a horizontal axis designated $b$. The horizontal axis of rotation of the cutting wheel is therefore laterally offset with respect to the vertical axis of rotation of the cutter holder with the result that the cutting wheel is caused to trail the cutter holder upon movement of the cutting unit around the template. That is to say, since the cutting wheel is out of alignment with the vertical axis about which the cutter holder rotates, the said wheel will lag behind upon movement of the cutting unit and thus hold its proper relation to the line of cut.

The upwardly projecting rectangular portion 107 of cutter holder 106 of the lower cutting unit 19 is freely rotatable about a vertical axis defined by the stub shaft 163, while the horizontal axis about which the cutting wheel 20 rotates is defined by the axis 164 for said cutting wheel. The axle 164 is laterally offset from the stub shaft 163 so that the cutting wheel will be caused to trail the holder in the same manner as the cutting wheel of the upper cutting unit.

Because of the fact that the cutter holders of the cutting units are freely rotatable, it is necessary that means be provided for maintaining the cutting wheels in proper position between successive operations, such as during the removal of the cut sheet and the placement of another sheet to be cut, to the end that when the cutting wheels are again brought into engagement with the sheet they will be in proper position for cutting. To this end, means is provided coacting with the cutter holders for preventing rotation of said holders between successive cutting operations.

With reference to the upper cutting unit 17, the shaft 56 thereof is hollow and extending downwardly therethrough and also through an opening 165 in roller 73 (Fig. 5) is a pin 166 having its lower end disposed in alignment with a recess 167 in the rotatable core 183 of cutter holder 83. The pin 166 is normally urged downwardly by a leaf spring 170 secured to operating handle 124, while the downward movement of said pin is controlled by a nut 169 threaded thereupon. Although the pin is continuously urged downwardly by the spring 170, the lower end thereof is spaced slightly from the cutter holder 83 when the cutting wheel 18 is lowered into cutting position. However, upon completion of the cutting operation and raising of the cutting wheel off of the glass, the lower end of pin 166 is received within a recess 167 in the rotatable core 183 and will prevent turning of the cutter holder until the cutting wheel is again lowered into cutting position.

Figure 8:
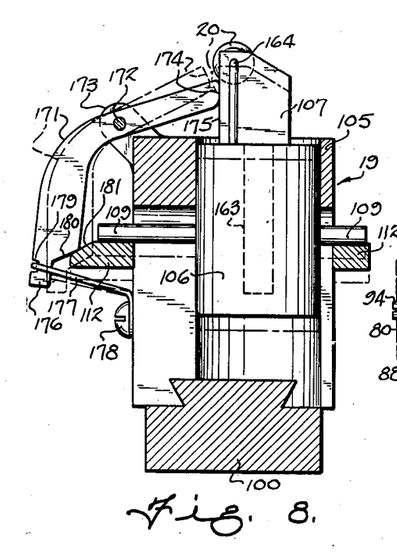
Fig. 8 is a detail vertical section of the lower cutting unit taken substantially on line 8—8 of Fig. 4.

On the other hand, the projecting portion 107 of cutter holder 106 of the lower cutting unit 19 is prevented from rotating when the sheet is removed from the table and the said cutting wheel moved upwardly to elevated position. To this end, there is provided, as shown in Fig. 8, a lever 171 pivoted intermediate its ends as at 172 to a bracket 173 formed on well 105. The lever 171 is provided at its upper end with a flat surface 174 adapted to engage the corresponding flat surface 175 of the cutter holder. The lever is provided at its opposite end with a reduced portion 176 engageable by a spring 177 secured to the well 105 by screw 178. The lever is preferably notched as at 179 to receive the spring therein and is further provided with a beveled surface 180 adapted to coact with a correspondingly beveled surface 181 on the adjacent leg 112 of lever 110. When the sheet to be cut is properly clamped upon the cutting table 11 and the cutting wheel 20 moved downwardly, the lever 171 will assume the position indicated by the broken lines in Fig. 8 so as not to interfere with the free rotation of the cutter holder. However, when the cutting operation is completed and the cut sheet removed, the lever 110 will be urged upwardly by spring 115 to cause the legs 112 thereof engaging pins 109 to move the cutting wheel upwardly. When this occurs, the beveled surface 181 on leg 112 engaging beveled surface 180 on lever 171 will rock the lever in a clockwise direction to urge the upper end thereof into engagement with the cutter holder and when the flat end surface 174 of the lever engages the flat surface 175 of the cutter holder, the cutting wheel will be effectively prevented from rotating about a vertical axis.

It is believed that the operation of the machine will be readily apparent from the above description. Thus, when the cutting machine is not being used, the upper and lower cutting units 17 and 19 are held in the position shown in Fig. 2 by the latch 126. The clamping pads 140 and 141 will be in lowered position as will also the upper cutting wheel 19, while the lower cutting wheel will be urged upwardly by the spring 115; also, the pad 115 will be slightly elevated above the top of the table. When it is desired to position a sheet for cutting, the rod 149 is actuated by the operator to raise the clamping pads 140 and 141 and at the same time effect the raising of the cutting wheel 18. Upon raising of the cutting wheel, the lower end of pin 166 will be received within recess 167 in the cutter holder to prevent it from turning until subsequently lowered into cutting position. The sheet is then placed upon the table and it is maintained out of contact with the cutting wheel 20 of the lower cutting unit 19 by means of the pad 155.

When the sheet has been properly positioned upon the table, the operator releases rod 149, whereupon clamping pads 140 and 141 will be lowered upon the sheet and at the same time force the sheet downwardly upon the table and into engagement with the lower cutting wheel 20 against the action of spring 156. Upon lowering of the clamping pads, the upper cutting wheel 18 will also be lowered into engagement with the sheet. The operator then actuates rod 132 to move latch 126 out of engagement with disk 125, whereupon the operator by grasping handle 124 can move the upper cutting unit 17 around the template 16 with the lower cutting unit 19 moving in unison therewith to simultaneously cut the opposite surfaces of the sheet.

As pointed out above, the machine of this invention is of especial utility in the cutting of concavo-convex lenses, such as are ordinarily used in goggles, gas masks, and the like, and has been illustrated and described in this connection, although it obviously may be employed for cutting other curved glass articles. Likewise, the machine may also be utilized for cutting single sheets or plates of glass in which case only the upper cutting unit 17 would be required. It is preferred that a plurality of lenses, as indicated at 186 in Fig. 1, be cut from the sheet of laminated safety glass 12, it being understood that after each cut has been made the sheet is moved along the table a sufficient distance and another lens cut therefrom. In order to determine the proper distance the sheet should be moved after each cut, there is provided a gauge bar 187 extending longitudinally of the table and suitably secured at its inner end to the lower end of the template supporting standard 38. Carried by the gauge bar 187 are the plurality of pointers 188 spaced from one another a distance slightly greater than the longitudinal diameter of the lenses to be cut. In practice, after each cutting operation the sheet 12 is moved along the table to bring the outer end of said sheet into alignment with the next pointer 188.

It is to be understood that the form of the invention herewith shown and described is to be taken as a preferred embodiment of the same, and that various changes in the shape, size and arrangement of parts may be resorted to without departing from the spirit of the invention or the scope of the subjoined claims.

I claim:

1. In a machine for cutting articles from curved sheets or plates of glass and the like, means for supporting the curved sheet in a substantially horizontal position, a template mounted above said supporting means and having a configuration corresponding to the article to be cut from said sheet, a cutting unit mounted to travel upon said template including a cutting tool engaging the said sheet, and means for mounting said cutting unit for swinging movement transversely of said supporting means and for sliding movement longitudinally thereof.

2. In a machine for cutting articles from curved sheets or plates of glass and the like, supporting means for the sheet having a curved upper surface corresponding to the curvature of said sheet, a template mounted above said supporting means curved to correspond to the curvature of the upper surface of said supporting means and having a contour corresponding to the article to be cut from said sheet, a cutting unit mounted to travel upon said template including a cutting tool engaging the said sheet, and means for mounting said cutting unit for swinging movement transversely of said supporting means and for sliding movement longitudinally thereof.

3. In a machine for cutting articles from curved sheets or plates of glass and the like, a substantially rectangular table having a transversely curved upper surface, a template mounted above said table also transversely curved to correspond to the curvature of the upper surface of said table and having a contour corresponding to the article to be cut from said sheet, a cutting unit mounted to travel upon said template including a cutting tool engaging the said sheet, and means for mounting said cutting unit for swinging movement transversely of said table and for sliding movement longitudinally thereof.

4. In a machine for cutting articles from curved sheets or plates of glass and the like, means for supporting the curved sheet in a substantially horizontal position, a template mounted above said supporting means and having a configuration corresponding to the article to be cut from said sheet, a cutting unit mounted to travel upon said template including a cutting tool engaging the upper surface of said sheet, a second cutting unit mounted beneath said supporting means including a cutting tool engaging the bottom surface of said sheet, means connecting the upper and lower cutting units together, and means for mounting said last-named means for pivotal movement transversely of the said supporting means and for horizontal sliding movement longitudinally thereof.

5. In a machine for cutting articles from curved sheets or plates of glass and the like, supporting means for the sheet having a curved upper surface corresponding to the curvature of said sheet, a template mounted above said supporting means curved to correspond to the curvature of the upper surface of said supporting means and having a contour corresponding to the article to be cut from said sheet, a cutting unit mounted to travel upon said template including a cutting tool engaging the upper surface of said sheet, a second cutting unit mounted beneath said supporting means including a cutting tool engaging the bottom surface of said sheet, means connecting the upper and lower cutting units together, and means for mounting said last-named means for pivotal movement transversely of the said supporting means and for horizontal sliding movement longitudinally thereof.

6. In a machine for cutting articles from curved sheets or plates of glass and the like, a substantially rectangular table having a transversely curved upper surface, a template mounted above said table also transversely curved to correspond to the curvature of the upper surface of said table and having a contour corresponding to the article to be cut from said sheet, a cutting unit mounted to travel upon said template including a cutting tool engaging the upper surface of said sheet, a second cutting unit mounted beneath said table including a cutting tool engaging the bottom surface of said sheet, means connecting the upper and lower cutting units together, and means for mounting said last-named means for pivotal movement transversely of the said table and for horizontal sliding movement longitudinally thereof.

7. In a machine for cutting articles from curved sheets or plates of glass and the like, means for supporting the curved sheet in a substantially horizontal position, a template mounted above said supporting means and having a configuration corresponding to the article to be cut from said sheet, a cutting unit mounted to travel upon said template including a cutting tool engaging the upper surface of said sheet, a second cutting unit mounted beneath said supporting means including a cutting tool engaging the bottom surface of said sheet, means connecting the upper and lower cutting units together, means for mounting said cutting units upon said connecting means to turn about aligned vertical axes, and driving connections between the said cutting units for causing the lower cutting unit to turn with the upper cutting unit as said upper cutting unit travels around said template.

8. In a machine for cutting articles from curved sheets or plates of glass and the like, supporting means for the sheet having a curved upper surface corresponding to the curvature of said sheet, a template mounted above said supporting means curved to correspond to the curvature of the upper surface of said supporting means and having a contour corresponding to the article to be cut from said sheet, a cutting unit mounted to travel upon said template including a cutting tool engaging the upper surface of said sheet, a second cutting unit mounted beneath said supporting means including a cutting tool engaging the bottom surface of said sheet, means connecting the upper and lower cutting units together, means for mounting said cutting units upon said connecting means to turn about aligned vertical axes, and driving connections between the said cutting units for causing the lower cutting unit to turn with the upper cutting unit as said upper cutting unit travels around said template.

9. In a machine for cutting articles from curved sheets or plates of glass and the like, a substantially rectangular table having a transversely curved upper surface, a template mounted above said table also transversely curved to correspond to the curvature of the upper surface of said table and having a contour corresponding to the article to be cut from said sheet, a cutting unit mounted to travel upon said template including a cutting tool engaging the upper surface of said sheet, a second cutting unit mounted beneath the table including a cutting tool engaging the bottom surface of said sheet, means connecting the upper and lower cutting units together, means for mounting said cutting units upon said connecting means to turn about aligned vertical axes, and driving connections between the said cutting units for causing the lower cutting unit to turn with the upper cutting unit as said upper cutting unit travels around said template.

10. In a machine for cutting articles from curved sheets or plates of glass and the like, a substantially rectangular table having a transversely curved upper surface, a template mounted above said table also transversely curved to correspond to the curvature of the upper surface of said table and having a contour corresponding to the article to be cut from said sheet, a cutting unit mounted to travel upon said template including a cutting tool engaging the upper surface of said sheet, a second cutting unit mounted beneath said table including a cutting tool engaging the bottom surface of said sheet, means connecting said upper and lower cutting units together to operate in unison, and means for locking the cutting units against movement between successive cutting operations.

11. In a machine for cutting articles from curved sheets or plates of glass and the like, a substantially rectangular table having a transversely curved upper surface, a template mounted above said table also transversely curved to correspond to the curvature of the upper surface of said table and having a contour corresponding to the article to be cut from said sheet, a cutting unit mounted to travel upon said template including a cutting tool engaging the upper surface of said sheet, a second cutting unit mounted beneath said table including a cutting tool engaging the bottom surface of said sheet, means connecting said upper and lower cutting units together to operate in unison, means for locking the cutting units against movement between successive cutting operations, and means under the control of an operator for releasing said locking means at the beginning of each cutting operation.

12. In a machine for cutting articles from curved sheets or plates of glass and the like, a substantially rectangular table having a transversely curved upper surface, a template mounted above said table also transversely curved to correspond to the curvature of the upper surface of said table and having a contour corresponding to the article to be cut from said sheet, a cutting unit mounted to travel upon said template including a cutting tool engaging the upper surface of said sheet, a second cutting unit mounted beneath said table including a cutting tool engaging the bottom surface of said sheet, means connecting said upper and lower cutting units together to operate in unison, means for clamping the sheet to be cut upon said table, and coacting means on said clamping means and upper cutting unit for raising the cutting tool of said upper cutting unit out of cutting position upon raising of said clamping means to release the sheet.

13. In a machine for cutting articles from curved sheets or plates of glass and the like, a substantially rectangular table having a transversely curved upper surface, a template mounted above said table also transversely curved to correspond to the curvature of the upper surface of said table and having a contour corresponding to the article to be cut from said sheet, a cutting unit mounted to travel upon said template including a cutting tool engaging the upper surface of said sheet, a second cutting unit mounted beneath said table including a cutting tool engaging the bottom surface of said sheet, means connecting said upper and lower cutting units together to operate in unison, clamping means for holding the sheet upon said table during the cutting operation, means under the control of an operator for releasing said clamping means at the completion of the cutting operation, and means actuated by said clamping means upon the release thereof for raising the cutting tool of the upper cutting unit out of contact with the said sheet.

14. In a machine for cutting articles from curved sheets or plates of glass and the like, a substantially rectangular table having a transversely curved upper surface, a template mounted above said table also transversely curved to correspond to the curvature of the upper surface of said table and having a contour corresponding to the article to be cut from said sheet, a cutting unit mounted to travel upon said template including a cutting tool engaging the upper surface of said sheet, a second cutting unit mounted beneath said table including a cutting tool engaging the bottom surface of said sheet, means connecting said upper and lower cutting units together to operate in unison, means carried by the table for maintaining the sheet out of engagement with the cutting tool of the lower cutting unit during the positioning of said sheet upon said table, and means for moving the said sheet into engagement with the cutting tool of the lower cutting unit.

15. In a machine for cutting articles from curved sheets or plates of glass and the like, a substantially rectangular table having a transversely curved upper surface, a template mounted above said table also transversely curved to correspond to the curvature of the upper surface of said table and having a contour corresponding to the article to be cut from said sheet, a cutting unit mounted to travel upon said template including a cutting tool engaging the upper surface of said sheet, a second cutting unit mounted beneath said table including a cutting tool engaging the bottom surface of said sheet, means connecting said upper and lower cutting units together to operate in unison, a pad carried by the table and yieldably maintained above the level thereof for holding the sheet out of engagement with the cutting tool of the lower cutting unit during positioning of said sheet upon said table, and means for clamping the sheet upon the table and for simultaneously depressing said pad to bring the sheet into engagement with the cutting tool of the lower cutting unit.

16. In a machine for cutting articles from curved sheets or plates of glass and the like, supporting means for the sheet having a curved upper surface corresponding to the curvature of said sheet, a template mounted above said supporting means curved to correspond to the curvature of the upper surface of said supporting means and having a contour corresponding to the article to be cut from said sheet, a cutting unit mounted to travel upon said template including a cutter holder freely rotatable about a vertical axis, a cutting tool carried by said holder in offset relation to said vertical axis so that said cutting tool will be caused to trail the said holder upon movement of said cutting unit around said template, means for raising said cutting tool from the sheet at the completion of the cutting operation, and means for preventing turning of the cutter holder while in raised position so that when the tool is subsequently lowered into cutting position it will be in proper position for the cutting operation.

17. In a machine for cutting articles from curved sheets or plates of glass and the like, a substantially rectangular table having a transversely curved upper surface, a template mounted above said table also transversely curved to correspond to the curvature of the upper surface of said table and having a contour corresponding to the article to be cut from said sheet, a cutting unit mounted to travel upon said template including a cutting tool engaging the upper surface of said sheet, a second cutting unit mounted beneath said table including a cutting tool engaging the bottom surface of said sheet, means connecting said upper and lower cutting units together to operate in unison, said second cutting unit comprising a cutter holder for the cutting tool freely rotatable about a vertical axis, means for yieldably urging said cutter holder upwardly, and means for preventing turning of the cutter holder while in its upper position so that when the said tool is subsequently lowered upon engagement of the sheet to be cut therewith it will be in proper position for the cutting operation.

CARL B. WILLIAMS, Jr.